UNITED STATES PATENT OFFICE.

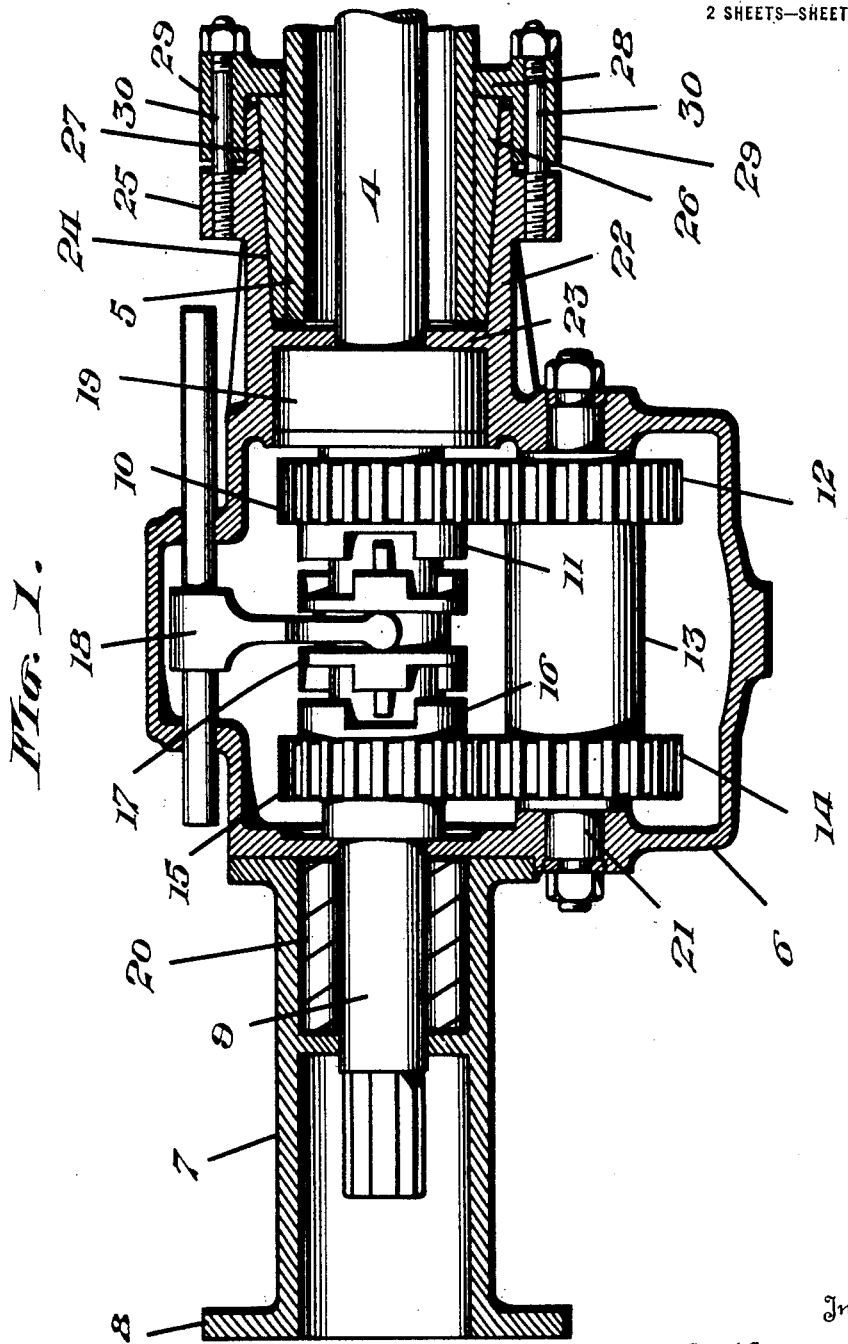

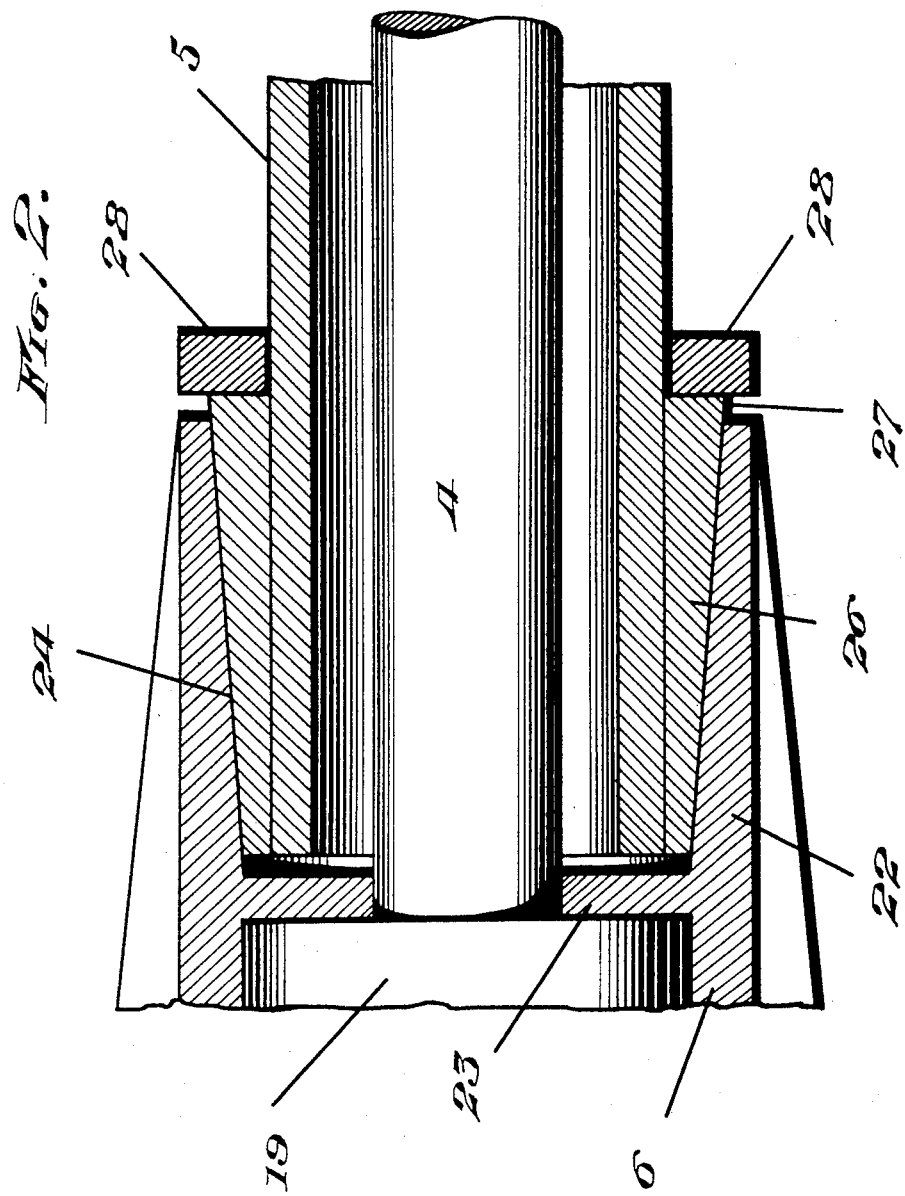

DON L. KIMBALL, OF PORTLAND, OREGON, ASSIGNOR TO UNIVERSAL TRANSMISSION CO., OF SEATTLE, WASHINGTON.

TRANSMISSION MECHANISM.

1,398,101.  Specification of Letters Patent.  Patented Nov. 22, 1921.

Application filed December 9, 1920. Serial No. 429,503.

*To all whom it may concern:*

Be it known that I, DON L. KIMBALL, a subject of the King of Great Britain, residing at Portland, in the county of Multnomah and State of Oregon, have invented certain new and useful Improvements in Transmission Mechanism; and I do hereby declare the following to be a full, clear, and exact description of the invention, such as will enable others skilled in the art to which it appertains to make and use the same.

The present invention relates generally to transmission mechanisms, and more especially to transmission gearing for motor vehicles.

The object of the invention is the provision of novel and improved means for attaching together the drive shaft housing and a casing inclosing the speed change gearing, whereby said housing is securely fastened to the casing and the parts centered with respect to one another.

A further object is to provide a wedge to fit between the drive shaft housing and gear casing and means for pulling said casing and housing together into true position with a firm connection between them.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:—

Figure 1 is a longitudinal section of the mechanism, portion being shown in elevation.

Fig. 2 is an enlarged diametrical section through the joint between the housing and casing at an angle with the plane of section in Fig. 1.

The drive shaft 4 is inclosed within the usual tubular housing 5, said shaft and housing being the same as generally used on motor vehicles, and they extend rearwardly from the engine to transmit the power to the rear axle. The transmission mechanism includes a gear casing 6 interposed between the end of the housing 5 and an extension housing 7 secured to the casing 6 and provided with a flange 8 for attachment to the usual differential housing (not shown), and an extension shaft 9 is mounted within the housing 7 to connect with the differential in the manner that the drive shaft 4 ordinarily connects with such differential, as well known. The gearing in the casing is for the purpose of obtaining a speed change ratio between the shafts 4 and 9, although the particular gearing is already known. The gearing includes a gear 10 secured on the end of the shaft 4 within the casing 6, and meshing with a gear 12 secured on a sleeve 13, and a second gear 14 on said sleeve meshes with a loose gear 15. The gears 10 and 15 have the clutch portions 11 and 16, and a clutch member 17 is slidably connected with the shaft 9 to turn therewith and to alternately engage the clutch portions 11 and 16. Said clutch member is shifted by means of a suitable shifter 18, and when the clutch member is in intermediate position, the connection between the shafts 4 and 9 is broken. When the clutch member 17 is shifted into engagement with the gear 10, then the power is transmitted from the gear 10 to the clutch member 17 direct to the shaft 9, so that said shaft 9 rotates with the drive shaft 4, whereas when the clutch member 17 is moved into engagement with the gear 15, the power is transmitted through the gears 10 and 12, sleeve 13 and gears 14 and 15 to the clutch member 17 and the shaft 9, and said gears are of such diameter as to change the speed of rotation of shaft 9 with respect to the shaft 4 so as to obtain the reduced speed of the shaft 9, or if desired, an increased speed, according to the gears used.

A bearing 19 for the shaft 4 is fitted within the casing 6, and a bearing 20 for the shaft 9 is provided within the extension housing 7, while the sleeve 13 rotates on an arbor 21 having its ends secured within the casing 6.

Coming to the gist of the invention, including the connection between the casing 6 and housing 5, the casing 6 is formed with a tubular sleeve 22 extending therefrom and provided therein near its inner end, with an annular flange 23. The bearing 19 is fitted within the inner end portion of the sleeve against the flange 23, and the inner surface or bore of the sleeve is tapered or gradually decreased in diameter from the outer end of the sleeve to the flange 23 thus providing a tapered socket 24, into which the end of the housing extends. The sleeve 22 is provided whereon with any suitable number of outstanding apertured lugs 25.

A cuff or band 26 is shrunk or otherwise secured on the end portion of the housing 5, and is externally tapered or decreased in diameter toward the end of the housing to fit snugly within the tapered socket 24 of the sleeve 22, whereby to center the shaft 4 and housing 5 with respect to the casing 6 and other parts.

The housing 5 and casing 6 are pulled together whereby to bind the cuff 26 and sleeve 22 together tightly in true position, and, for this purpose, a ring 28 is fitted on the housing 5, and bears against the larger end or shoulder of the cuff 26. Said ring has apertured outstanding lugs 29 to register with the lugs 25 and extended from the ring 28 to overlap the sleeve 22, and suitable bolts 30 extend through the lugs 25 and 29 for drawing the ring 28 toward the sleeve 22, thereby pushing the cuff 26 and housing 5 into the sleeve 22 until the parts bind tightly together.

In this manner, by slipping the ring 28 onto an ordinary drive shaft housing 5 of a motor vehicle and securing the cuff 26 on the end portion of the housing, said housing can be readily secured to the gear casing 6 to provide a rigid connection and to simultaneously accurately position the housing and drive shaft with respect to the casing 6 and gears therein. The arrangement is simple, practical, and efficient for the purpose of attaching the gear mechanism to the drive housing, to provide an additional speed change.

Having thus described the invention, what is claimed as new is:—

1. In combination, a shaft housing, a gear casing having a sleeve with a tapered socket, a tapered cuff embracing and rigidly secured to said housing to fit into said socket, and means for drawing said housing and casing together.

2. In combination, a shaft housing, a gear casing having a sleeve with a tapered socket, a tapered cuff embracing and rigidly secured to said housing to fit within said socket and center the housing and casing relatively to one another, a ring on the housing bearing against the cuff, and means for drawing said ring toward said sleeve to push the cuff into said socket.

3. In combination, a shaft housing, a gear casing having a sleeve projecting therefrom, said sleeve having a tapered socket and outstanding lugs spaced from the end of the sleeve, a tapered cuff embracing and rigidly secured to said housing to fit into said socket, a ring on said housing bearing against said cuff and having lugs overlapping said sleeve to register with the aforesaid lugs, and means connecting the lugs for drawing the ring toward the sleeve to push the cuff into said socket.

4. In combination, a drive shaft, a housing for said shaft, a speed change mechanism operated by said shaft and including a casing having a sleeve projecting therefrom, said sleeve having an annular flange therein and a socket tapering from the end of said sleeve toward said flange, a tapered cuff embracing and rigidly secured to the housing to fit into said socket, and means for drawing the housing and casing together with the ends of the housing and cuff adjacent to the flange.

In testimony whereof I have signed my name to this specification in the presence of two subscribing witnesses.

DON L. KIMBALL.

Witnesses:
EMMA H. DATE,
ANNA L. DRAKE.